Patented June 6, 1944

2,350,749

UNITED STATES PATENT OFFICE 2,350,749

PROCESS FOR PREPARING CERAMIC MASSES

Fritz Gareis, Wirges, Westerwald, Germany; vested in the Alien Property Custodian No Drawing. Application January 9, 1941, Serial No. 373,797. In Germany January 24, 1940

4 Claims. (Cl. 106—72)

This invention relates to improvements in preparing moist but not pourable ceramic masses to avoid defects or irregularities caused by the development of gases within the masses.

Ceramic masses, which have been prepared with the addition of water not sufficient to make them pourable, often require subdividing the mass, for instance, by means of the helical blades of the extruding press, or, when the material is molded by hand, by forming lumps. Along the faces of contact of two portions of the mass which are rejoined in the molding process, sometimes also across one portion of the mass, a number of interstices or blisters appear in the finished stone whereby its quality is considerably diminished. This phenomenon hitherto could not satisfactorily be explained, and correspondingly all efforts to remedy this defect substantially failed.

By extensive investigations I have ascertained that the interstices do not occur in the freshly molded product but are engendered later on. As the first cause of the defect I positively recognized a development of a gas. The nature of this gas depends upon the character of certain mineral substances which are admixed to the raw material in finest distribution and cannot be discovered often even microscopically. For instance, from sulfidic minerals sulfuretted hydrogen may be produced in traces which can only difficultly be ascertained by analysis, but which suffice to considerably deteriorate the quality of the goods. Theoretically 3.74 c. cm. of sulfuretted hydrogen are formed from 0.01 gram iron sulfide. This amount suffices to provoke the strong formation of blisters in a plurality of stones. The defect is caused by an amount of sulfuretted hydrogen which appears only in the fifth decimal by way of analysis.

I found that the defect can be avoided by the addition of certain substances which prevent the formation of a gas during the time from molding to drying. Means adapted for this purpose are substances, which react with the contaminations or with the gases in statu nascendi and convert them into nongaseous compounds. For instance, dissolved lead, copper, arsenic, antimony, tin, silver, mercury, &c. compounds transform the sulfur of iron sulfide to lead sulfide or the corresponding other sulfide, or oxidants such as potassium dichromate, potassium permanganate, hydrogen peroxide &c. precipitate sulfur from iron sulfide or produce sulfates. The reaction of carbonic acid which might be formed by the decomposition of carbonates or carbonaceous matter may be prevented by the addition of substances capable of absorbing or binding, under the prevailing conditions, the carbon dioxide otherwise developed. Such substances are compounds of alkaline earths or numerous compounds of heavy metals, such as lead, cadmium, silver &c.

Examples

In practice finely distributed sulfidic minerals were admixed to fat clay; from this material clinkers were produced. Strong formation of blisters was observed. The dry material was mixed with 20% of its weight water. By the addition of 1% of lead acetate to the water the formation of blisters was avoided. Likewise by the addition of 0.08% of potassium dichromate the formation of blisters was entirely prevented.

The proportion of the substance required for preventing the defect depends upon the quality and quantity of the gas-forming minerals contained in the raw material.

I claim:

1. The process of preparing moist but not pourable ceramic masses to prevent the formation of gases from contaminations contained therein which process comprises admixing, before molding, water soluble chemical substances to the masses adapted to act in statu nascendi on gaseous products of decomposition originating from said contaminations with the formation of nongaseous compounds.

2. The process of preparing moist but not pourable ceramic masses to prevent the formation of gases from sulfidic contaminations contained therein which process comprises admixing to the masses, before molding, solutions of water soluble chemical substances which combine, under the prevailing conditions, with sulfur to form nongaseous compounds.

3. The process of preparing moist but not pourable ceramic masses to prevent the formation of gases from sulfidic contaminations contained therein which process comprises admixing, before molding, a water soluble oxidizing agent to the masses.

4. The process of preparing moist but not pourable ceramic masses to prevent the formation of gases from carbonaceous contaminations contained therein which process comprises admixing to the masses, before molding, a water soluble substance adapted to combine with carbon dioxide.

FRITZ GAREIS.